United States Patent Office 3,248,389
Patented Apr. 26, 1966

3,248,389
6α - FLUORO-Δ$^{1,4}$-PREGNADIEN-16α,17α,21-TRIOL-3, 20-DIONES AND INTERMEDIATES IN THE PRODUCTION THEREOF
Howard J. Ringold and Albert Bowers, Mexico City, Mexico, assignors, by mesne assignments, to Syntex Corporation, a corporation of Panama
No Drawing. Filed Sept. 22, 1958, Ser. No. 762,232
Claims priority, application Mexico, Sept. 23, 1957, 48,899
34 Claims. (Cl. 260—239.55)

The present invention relates to cyclopentanophenanthrene derivatives and to a process for the production thereof.

More particularly the present invention relates to 6α-fluoro-Δ$^{1,4}$-pregnadien-16α,17α,21-triol-3,20-dione and 6α-fluoro-Δ$^4$-pregnen-16α,17α,21-triol-3,20-dione compounds having an 11-keto or an 11β-hydroxy group and also having in some instances a 9α-chloro or 9α-fluoro substituent. The present invention also relates to 21-mono esters and 16,21-diesters of these compounds of hydrocarbon carboxylic acids of less than 12 carbon atoms. All of the compounds just referred to and hereinafter described in detail are active cortical type hormones having a pronounced anti-inflammatory and other effects of this type of hormone, together with less undesirable side reactions such as, for example, sodium retention.

In accordance with the present invention it has been discovered that the novel 6α-fluoro-Δ$^{1,4}$-pregnadien-16α, 17α,21-triol-3,20-dione derivatives having an 11-keto or 11β-hydroxy and with or without a 9α-chloro or 9α-fluoro substituent may be prepared from the corresponding 6α-fluoro-cortisone compounds with or without a 9α-chloro or 9α-fluoro-substituent. These compounds are disclosed in U.S. applications Serial No. 740,550, filed June 9, 1958, now Patent No. 2,934,546, and Serial No. 749,652, filed July 21, 1958, now Patent No. 2,951,840. The aforementioned 6α-fluoro-cortisone compounds are first converted to the corresponding 3,20-bis ketals, the ketals (in form of their 21-esters) were then dehydrated at C–16(17). The C–16(17) double bond was then hydroxylated to form the corresponding 6α-fluoro-16α-hydroxy-cortisone compound. To form the 11β-hydroxy derivatives the 3,20-bis ketals of the 6α-fluoro cortisone compounds are first reduced to the hydrocortisone type compounds. By reaction with selenium dioxide or other conventional dehydrogenation agents the 6α-fluoro-16α-hydroxy-cortisone or hydrocortisone derivatives were converted to the corresponding prednisone or prednisolone derivatives.

Certain of the novel final compounds and cortical hormones of the present invention are illustrated by the following formula:

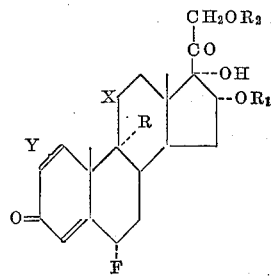

In the above formula X represents =O or

Y represents a double bond between C–1 and C–2 or a saturated linkage between C–1 and C–2, R represents hydrogen chlorine or fluorine and $R_1$ and/or $R_2$ represents hydrogen or a hydrocarbon carboxylic acyl group of less than 12 carbon atoms. $R_1$ may be noted, however, is an acyl group only when $R_2$ is also an acyl group. These acyl groups may be saturated or unsaturated, straight or branched chain aliphatic, cyclic or mixed cyclic-aliphatic and may be conventionally substituted as by halogen or methoxy. Typical acyl groups are acetate, propionate, butyrate, cyclopentylpropionate, benzoate, enanthate, etc.

The novel compounds above set forth as well as certain novel intermediates were prepared by a process illustrated in part by the following equation:

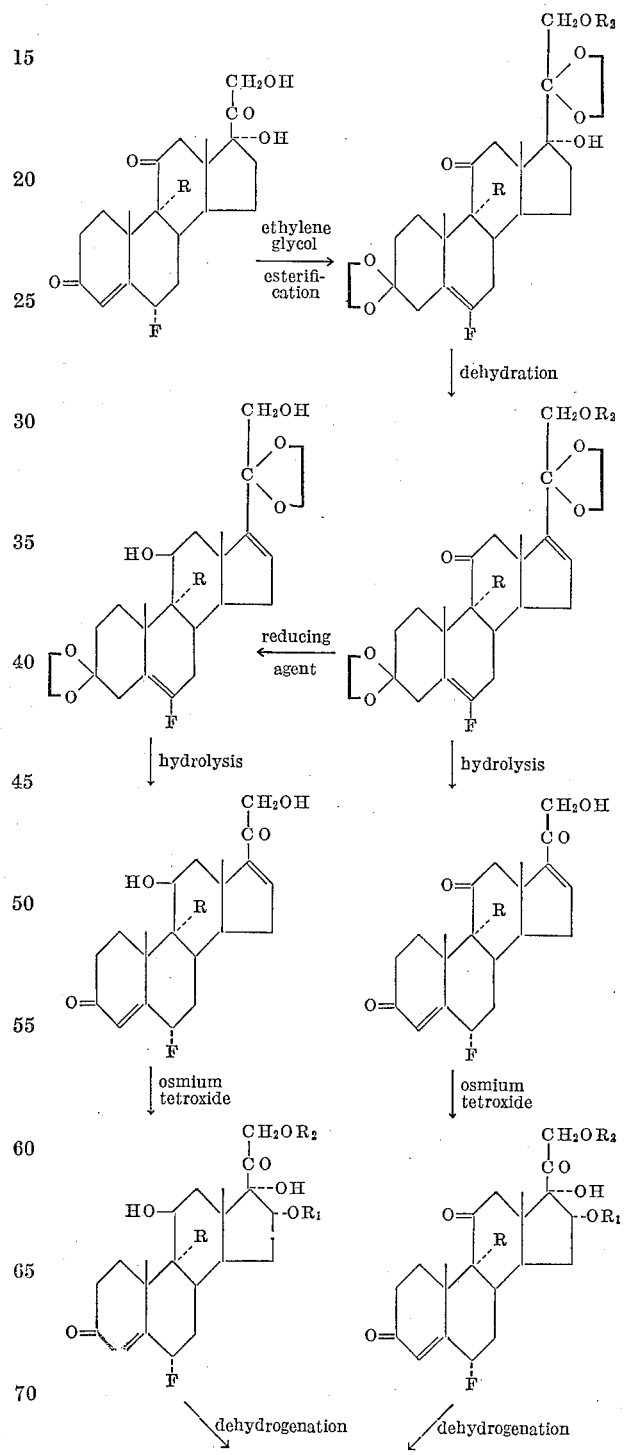

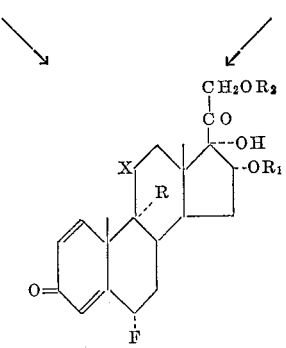

In the above equation X, R, $R_1$ and $R_2$ represent the same groups as heretofore set forth.

In practicing the process above outlined 6α-fluoro-9α-chloro-cortisone is conventionally refluxed with ethylene glycol in the presence of benzene and p-toluenesulfonic acid to form the corresponding 3,20-bis-cycloethyleneketals thereof. The bis-ketals were then conventionally acylated at C–21 to form conventional esters as indicated in the equation. The esters were then reacted with thionyl chloride in pyridine solution to form the corresponding 21-acylate of 6-fluoro-3,20-bis-ethylenedioxy-$\Delta^{5,16}$-pregnadien-21-ol-11-one, or its 9α-fluoro or 9α-chloro analogue. The acyl group was then saponified by reaction with an alkali metal hydroxide under mild conditions and the ketal groups hydrolyzed with acid to prepare 6α-fluoro-, 6α-fluoro-9α-chloro- or 6α,9α-difluoro-$\Delta^{4,16}$-pregnadien-21-ol-3,11,20-trione. The same compounds having an 11β-hydroxy group were also prepared by reducing the 11-keto group of the last mentioned 3,20-bis-ethylenedioxy derivatives with lithium aluminum hydride. Reaction of $\Delta^{4,16}$-compounds having either an 11-keto or 11β-hydroxy group with osmium tetroxide under the conditions described by Bernstein et al. (J.A.C.S. 78, 1909 (1956)) gave 6α-fluoro-$\Delta^4$-pregnen-16α,17α,21-triol-3,11,20-trione, 6α,9α-difluoro-$\Delta^4$-pregnen-16α,17α,21-triol-3,11,20-trione and 6α-fluoro-9α-chloro-$\Delta^4$-pregnen-16α,17α,21-triol-3,11,20-trione, as well as the 11β-hydroxy derivatives namely 6α-fluoro-, 6α,9α-difluoro- and 6α-fluoro-9α-chloro-$\Delta^4$-pregnen-11β,16α,17α,21-tetrol-3,20-dione. The reaction of all of these compounds with selenium dioxide in t-butanol gave the corresponding $\Delta^{1,4}$-dienes. Preferably this reaction was with the compounds in the form of their 21-monoesters or 16,21-diesters followed by subsequent conventional saponification to form the free dienes.

All of the above compounds upon conventional esterification gave the corresponding 21-mono esters and 16,21-diesters of the type previously set forth. Reaction with a slight excess of acid anhydride gave the 21-mono esters and reaction with an excess of anhydride gave the 16,21-diesters. Mixed esters were formed by first esterifying at C–21 with one acid anhydride and subsequently treating the 21-mono ester with another acid anhydride.

The 16-hydroxy derivatives of the present invention were also obtained by incubating the corresponding 16-unsubstituted compounds with *Streptomyces roseochromogenus* as hereinafter set forth in detail.

The following specific examples serve to illustrate but are not intended to limit the present invention.

Example I

A mixture of 6 g. of 6α-fluoro-cortisone, 140 cc. of anhydrous benzene, 48 cc. of ethyleneglycol, distilled over sodium hydroxide, and 0.6 g. of p-toluenesulfonic acid was refluxed for 8 hours with the use of an adapter for the continuous removal of the water formed during the reaction. The cooled mixture was mixed with sodium bicarbonate solution and the organic layer was separated and washed with water, dried over anhydrous sodium sulfate, filtered and evaporated to dryness under reduced pressure. Crystallization of the residue from acetone-hexane yielded the 3,20-bis-cycloethyleneketal of 6α-fluoro-cortisone. The pure product was obtained after recrystallization from acetone-hexane.

Similarly there were prepared the 3,20-bis-ketals of 6α-fluoro-9α-chloro-cortisone and of 6α,9α-difluoro-cortisone.

5 g. of the above crude ketals was dissolved in 30 cc. of pyridine, mixed with 5 cc. of acetic anhydride and kept overnight at room temperature. After pouring into water the product was extracted with methylene dichloride, washed with water, dried over anhydrous sodium sulfate and evaporated to dryness under reduced pressure. The residue consisted of the 21-acetate of the crude ketal of 6α-fluoro-cortisone or of its analogues further having a halogen atom at C–9α. The pure products were obtained by recrystallization from acetone-hexane.

Example II

A solution of 5 g. of the 21-acetate bis-ketal of 6α-fluoro-cortisone (6-fluoro-21-acetoxy-3,20-bis-ethylenedioxy-$\Delta^5$-pregnen-17α-ol-11-one) in 50 cc. of pyridine was cooled to 0° C. and mixed under stirring with 3.0 cc. of thionyl chloride. The stirring was continued for 1 hour at 0° C. and then the mixture was poured into ice water and the product was extracted with methylene dichloride, well washed with water, dried over anhydrous sodium sulfate, filtered and evaporated to dryness. The residue was purified by chromatography, thus furnishing the 21-acetate of 6-fluoro-3,20-bis-ethylenedioxy-$\Delta^{5,16}$-pregnadien-21-ol-11-one.

5 g. of the above acetate was mixed with 50 cc. of 1% potassium hydroxide in methanol previously cooled to 0° C. and the mixture was stirred at 0° C. under an atmosphere of nitrogen for 1 hour. It was then neutralized with acetic acid and diluted with water. The precipitate was collected, washed with water, dried and purified by crystallization from acetone-hexane, thus giving the pure 6-fluoro-3,20-bis-ethylenedioxy-$\Delta^{5,16}$-pregnadien-21-ol-11-one.

A solution of 4 g. of the above compound in 700 cc. of ethanol was treated with 100 cc. of dilute sulfuric acid (8% by volume), refluxed for 40 minutes, cooled and neutralized with solid sodium bicarbonate; the mixture was concentrated to a small volume under reduced pressure and diluted with water. The precipitate was collected by filtration, washed with water, dried and crystalized from acetone-hexane, thus yielding the pure 6α-fluoro-$\Delta^{4,16}$-pregnadien-21-ol-3,11,20-trione.

A solution of 3 g. of the above compound in 60 cc. of anhydrous benzene and 2.8 cc. of pyridine was mixed with 3 g. of osmium tetroxide and the mixture was allowed to stand in the dark at room temperature for 4 days; the osmic ester was then decomposed by the addition of 150 cc. of water, 60 cc. of benzene, 110 cc. of methanol, 18 g. of sodium bicarbonate, with stirring for 4 hours. 200 cc. of chloroform was then added and the dark precipitate was filtered and washed with 800 cc. of hot choloroform. The organic layer was separated from the combined filtrates which was then washed with saturated sodium chloride solution, dried over anhydrous sodium sulfate, filtered and evaporated to dryness under reduced pressure. The residue was triturated with acetone, thus producing 6α-fluoro-16α-hydroxy-cortisone in crude form (6α-fluoro-$\Delta^4$-pregnen-16α,17α,21-triol-3,11,20-trione). Concentration of the mother liquors afforded an additional crop. The analytical sample was obtained by recrystallization from acetone-hexane.

1 g. of 6α-fluoro-16α-hydroxy-cortisone was dissolved in 10 cc. of pyridine, cooled to 0° C. and treated with approximately 0.3 cc. (1.1 mols) of acetic anhydride and the mixture was kept at 10° C. for 2 hours and then poured into water. The product was extracted with ethyl acetate, washed with dilute hydrochloric acid, sodium bicarbonate solution and water, dried over anhydrous sodium sulfate and evaporated under reduced pressure.

Crystallization of the residue from ethyl acetate yielded the 21-acetate of 6α-fluoro-16α-hydroxy-cortisone.

500 mg. of the above acetate was mixed with 25 cc. of anhydrous-t-butanol, 150 mg. of selenium dioxide and 0.05 cc. of pyridine and the mixture was refluxed for 70 hours under an atmosphere of nitrogen. After cooling, the mixture was diluted with 50 cc. of ethyl acetate and filtered through Celite, washing the filter with hot ethyl acetate. The combined filtrate and washings were evaporated to dryness under reduced pressure and the residue was triturated with water. The precipitate was collected by filtration, washed with water, dried and purified by chromatography on 25 g. of washed alumina. Elution with mixtures benzene-ether and with ether, followed by crystallization of the combined crystalline fractions afforded the 21 - acetate of 6α - fluoro - 16α - hydroxy-prednisone.

Example III

By the method of Example II, 6α-fluoro-9α-chloro-cortisone was converted into 6α - fluoro - 9α - chloro-16α-hydroxy-cortisone, its 21-acetate and that of 6α-fluoro-9α-chloro-16α-hydroxy-prednisone.

Example IV

Following the method of Example II, 6α,9α-difluoro-cortisone was converted into 6α,9α-difluoro-16α-hydroxy-cortisone, its 21-acetate and that of 6α,9α-difluoro-16α-hydroxy-prednisone.

Example V

A solution of 5 g. of 6-fluoro-3,20-bis-ethylenedioxy-$\Delta^{5,16}$-pregnadien-21-ol-11-one, prepared as described in Example II, in 150 cc. of anhydrous tetrahydrofurane was slowly added to a mechanically stirred suspension of 1.5 g. of lithium aluminum hydride in 100 cc. of anhydrous tetrahydrofurane and the mixture was refluxed for 30 minutes. The excess of anhydride was decomposed by the addition of a few drops of acetone and then 15 cc. of saturated aqueous sodium sulfate solution was added, followed by the addition of anhydrous sodium sulfate. The inorganic salts were removed by filtration and the solution was evaporated to dryness. Crystallization of the residue from acetone-ether yielded 6 - fluoro-3,20-bis-ethylenedioxy-$\Delta^{5,16}$-pregnadien-11β,21-diol.

In another experiment the above compound was obtained from the 21-acetate of 6-fluoro-3,20-bis-ethylene-dioxy-$\Delta^{5,16}$-pregnadien-21-ol - 11 - one, since the reaction with the hydride causes the simultaneous saponification of the acetoxyl group at C–21.

The ketal groups of the above compound were then hydrolyzed following the method described in Example II, to give 6α-fluoro-$\Delta^{4,16}$-pregnadien-11β,21-diol-3,20-dione, which was in turn subjected to the treatment with osmium tetroxide, as described in that example, to produce 6α-fluoro-16α-hydroxy-hydrocortisone.

There was then prepared the 21-acetate of 6α-fluoro-16α-hydroxy-hydrocortisone, and then the 21-acetate of 6α-fluoro-16α-hydroxy-prednisolone, following exactly the methods of acetylation and dehydrogenation as applied to 6α-fluoro-16α-hydroxy-cortisone.

Example VI

By the method of the previous example, the diketals having the additional halogen substituent at C–9α, described in Examples II, III and IV, were convertd into the following compounds: 6α-fluoro-9α-chloro - 16α - hydroxy-hydrocortisone, 6α,9α-difluoro-16α-hydroxy-hydrocortisone, their 21-acetates, as well as the 21-acetates of 6α-fluoro-9α-chloro-16α-hydroxy-prednisolone and of 6α, 9α-difluoro-16α-hydroxy-prednisolone.

Example VII

In other experiments, instead of using 1.1 molar equivalents of acetic anhydride for the acetylation of 6α-fluoro-16α-hydroxy-cortisone, in accordance with Example II, there were used approximately 3 mols of the reagent and the mixture was allowed to react overnight at room temperature. There was thus obtained the 16,21-diacetate of 6α-fluoro-16α-hydroxy-cortisone, and dehydrogenation of the latter with selenium dioxide afforded the 16,21-diacetate of 6α-fluoro-16α-hydroxy-prednisone.

Example VIII

A mixture of 1 g. of the 21-acetate of 6α,9α-difluoro-16α-hydroxy-hydrocortisone, prepared in accordance with Example VI, 10 cc. of pyridine and 1 cc. of propionic anhydride was kept overnight at room temperature, poured into water ond extracted with methylene dichloride. The extract was washed with dilute hydrochloric acid, 5% sodium carbonate solution and finally with water, dried over anhydrous sodium sulfate and evaporated to dryness. Crystallization of the residue furnished the 16 - propionate - 21 - acetate of 6α,9α - difluoro - 16α-hydroxy-hydrocortisone.

Example IX 1 g. of the 21-acetate of 6α-fluoro-16α-hydroxy-cortisone, obtained in accordance with Example III, was suspended in 10 cc. of methanol, cooled to 0° C. and treated with a solution of sodium methoxide prepared by dissolving 60 mg. of sodium metal in 5 cc. of anhydrous methanol. The mixture was stirred for 1 hour at 0° C. under an atmosphere of nitrogen, neutralized with acetic acid and diluted with water. The precipitate formed was collected, washed with water, dried and recrystallized. There was thus obtained the free 6α-fluoro-16α-hydroxy-cortisone.

Example X

By the method of the previous example, there were saponified the esterified groups at C–21 or at C–16 and C–21, respectively, of all of the 6α-fluoro and 6α-fluoro-9α-halo derivatives of 16α-hydroxy-cortisone, of 16α-hydroxy-hydrocortisone, of 16α-hydroxy-prednisone and of 16α-hydroxy-prednisolone described in the prior examples, thus producing the corresponding free triols and tetrols.

Example XI

All of the free alcohols obtained in accordance with the method of the previous example were esterified following the methods of esterification described in Examples II, VII and VIII.

The reaction with 1.1 molar equivalents of an anhydride of a hydrocarbon carboxylic acid of less than 12 carbon atoms gave the respective 21-esters, while the reaction with an excess of the anhydride produced their 16,21-diesters. There were specifically prepared in this conventional way in addition to the acetates and propionates previously described the 16,21-dibenzoates and dicyclopentylpropionates and the 21-monobenzoates and 21-monocyclopentylpropionates.

Example XII

A culture of *Streptomyces roseochromogenus* A.T.T.C. No. 3347 was prepared in an inclined agar medium containing 1% of glucose and 1% of yeast extract. 1 cc. of a suspension of this culture was then used to innoculate each one of a series of 250 cc. flasks containing 50 cc. of a sterilized aqueous medium of 2% peptone and 5% corn syrup; the mixtures were then incubated in a shaking machine at 28° C. under aeration for a period of 24–48 hours. There was thus a vegetating growing culture of *Streptomyces roseochromogenus* which was used for the subsequent incubation of the steroid.

10 g. of 6α-fluoro-cortisone was added to each 50 cc. of the vegetating culture of *Streptomyces roseochromogenus*, obtained as described above. The mixture was stirred for 48–72 hours with aeration and then extracted several times with methylene dichloride. The extract was washed with water, dried over anhydrous sodium sulfate, filtered and evaporated to dryness under reduced pressure.

The residue was purified by chromatography on silica, thus giving 6α-fluoro-16α-hydroxy-cortisone, identical with that previously obtained.

*Example XIII*

By the method described in the previous example, except that in some cases the incubation was extended to over 72 hours, there were obtained, from the corresponding 6α-fluoro and 6α-fluoro-9α-halo derivatives of cortisone, hydrocortisone, prednisone and prednisolone, the corresponding derivatives of 6α-fluoro-16α-hydroxy and of 6α-fluoro-9α-halo-16α-hydroxy derivatives of such cortical hormones.

We claim:
1. A compound of the following formula:

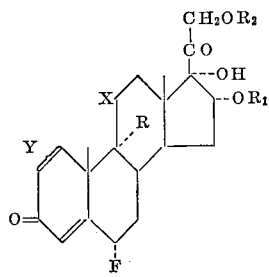

wherein X is selected from the group consisting of =O and

Y is selected from the group consisting of a double bond between C–1 and C–2 and a saturated linkage between C–1 and C–2, $R_1$ is hydrogen when $R_2$ is hydrogen and $R_1$ is selected from the group consisting of hydrogen and a hydrocarbon carboxylic acyl group of less than 12 carbon atoms when $R_2$ is a hydrocarbon carboxylic acyl group of less than 12 carbon atoms, and $R_2$ is selected from the group consisting of hydrogen and a hydrocarbon carboxylic acyl group of less than 12 carbon atoms and R is selected from the group consisting of hydrogen, fluorine and chlorine.

2. 6α - fluoro - Δ⁴ - pregnen - 11β,16α,17α,21 - tetrol-3,20-dione.
3. The 21-monoesters of hydrocarbon carboxylic acids of less than 12 carbon atoms of 6α-fluoro-Δ⁴-pregnen-11β,16α,17α,21-tetrol-3,20-dione.
4. 6α,9α - difluoro - Δ⁴ - pregnen - 11β,16α,17α,21-tetrol-3,20-dione.
5. The 21-monoesters of hydrocarbon carboxylic acids of less than 12 carbon atoms of 6α,9α-difluoro-Δ⁴-pregnen-11β,16α,17α,21-tetrol-3,20-dione.
6. The 16,21-diesters of hydrocarbon carboxylic acids of less than 12 carbon atoms of 6α,9α-difluoro-Δ⁴-pregnen-11β,16α,17α,21-tetrol-3,20-dione.
7. 6α - fluoro - 9α - chloro - Δ⁴ - pregnen - 11β,16α,17α,21-tetrol-3,20-dione.
8. The 21-monoesters of hydrocarbon carboxylic acids of less than 12 carbon atoms of 6α-fluoro-9α-chloro-Δ⁴-pregnen-11β,16α,17α,21-tetrol-3,20-dione.
9. The 16,21-diesters of hydrocarbon carboxylic acids of less than 12 carbon atoms of 6α-fluoro-9α-chloro-Δ⁴-pregnen-11β,16α,17α,21-tetrol-3,20-dione.
10. 6α - fluoro - Δ¹,⁴ - pregnadien - 11β,16α,17α,21-tetrol-3,20-dione.
11. The 21-monoesters of hydrocarbon carboxylic acids of less than 12 carbon atoms of 6α-fluoro-Δ¹,⁴-pregnadien-11β,16α,17α,21-tetrol-3,20-dione.
12. 6α,9α - difluoro - Δ¹,⁴-pregnadien - 11β,16α,17α,21-tetrol-3,20-dione.

13. The 21-monoesters of hydrocarbon carboxylic acids of less than 12 carbon atoms of 6α,9α-difluoro-Δ¹,⁴-pregnadien-11β,16α,17α,21-tetrol-3,20-dione.
14. The 16,21-diesters of hydrocarbon carboxylic acids of less than 12 carbon atoms of 6α,9α-difluoro-Δ¹,⁴-pregnadien-11β,16α,17α,21-tetrol-3,20-dione.
15. 6α - fluoro - 9α - chloro - Δ¹,⁴ - pregnadien - 11β,16α,17α,21-tetrol-3,20-dione.
16. The 21-monoesters of hydrocarbon carboxylic acids of less than 12 carbon atoms of 6α - fluoro-9α-chloro-Δ¹,⁴-pregnadien-11β,16α,17α,21-tetrol-3,20-dione.
17. The 16,21-diesters of hydrocarbon carboxylic acids of less than 12 carbon atoms of 6α-fluoro-9α-chloro-Δ¹,⁴-pregnadien-11β,16α,17α,21-tetrol-3,20-dione.
18. 6α - fluoro - 16α,17α,21 - trihydroxy - 1,4-pregnadiene-3,11,20-trione.
19. 6α,9α - difluoro - 16α,17α,21 - trihydroxy - 1,4-pregnadiene-3,11,20-trione.
20. 6α - fluoro - 11β,16α,17α,21 - tetrahydroxy - 1,4-pregnadiene-3,20-dione 16,21-diacetate.
21. 6α,9α - difluoro - 11β,16α,17α,21 - tetrahydroxy-1,4-pregnadiene-3,20-dione 16,21-diacetate.
22. 6α - fluoro - 16α,17α,21-trihydroxy - 1,4-pregnadiene-3,11,20-trione 16,21-diacetate.
23. 6α,9α - difluoro - 16α,17α,21-trihydroxy - 1,4 - pregnadiene-3,11,20-trione 16,21-diacetate.
24. 6α - fluoro - 16α,17α,21-trihydroxy - 4 - pregnene-3,11,20-trione.
25. 6α,9α - difluoro - 16α,17α,21 - trihydroxy - 4 - pregnene-3,11,20-trione.
26. 6α - fluoro - 11β,16α,17α,21 - tetrahydroxy-4-pregnene-3,20-dione 16,21-diacetate.
27. 6α,9α - difluoro - 11β,16α,17α,21 - tetrahydroxy - 4-pregnene-3,20-dione 16,21-diacetate.
28. 6α - fluoro - 16α,17α,21 - trihydroxy - 4 - pregnene-3,11,20-trione 16,21-diacetate.
29. 6α,9α - difluoro - 16α,17α,21 - trihydroxy - 4 - pregnene-3,11,20-trione 16,21-diacetate.
30. A 16-oxygenated pregnadiene of the formula

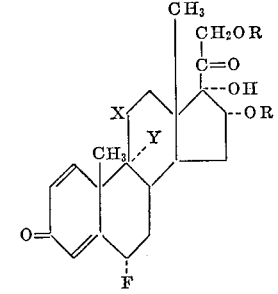

wherein Y is selected from the group consisting of hydrogen and fluorine, X is selected from the group consisting of the carbonyl radical and the β-hydroxymethylene radical, and R is the same member selected from the group consisting of hydrogen and the acyl radical of a hydrocarbon carboxylic acid containing less than 12 carbon atoms.

31. A 16-oxygenated pregnene of the formula

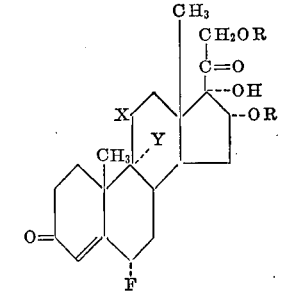

wherein Y is selected from the group consisting of hydrogen and fluorine, X is selected from the group consisting of the carbonyl radical and the β-hydroxymethylene radical, and R is the same member selected from the group consisting of hydrogen and the acyl radical of a hydrocarbon carboxylic acid containing less than 12 carbon atoms.

32. 6 - fluoro - 9α - Z - 3,20 - bis - ethylenedioxy - Δ⁵-pregnene-17α,21-diol-11-one, wherein Z is selected from the group consisting of hydrogen, fluorine and chlorine.

33. A compound of the formula:

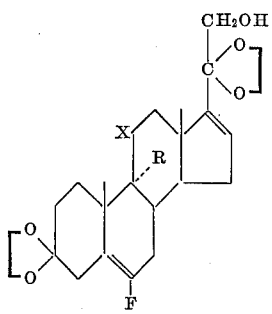

wherein X is selected from the group consisting of =O and

and R is selected from the group consisting of hydrogen, fluorine and chlorine.

34. A compound of the formula:

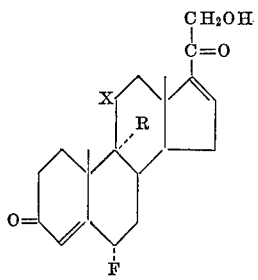

wherein X is selected from the group consisting of =O and

and R is selected from the group consisting of hydrogen, fluorine and chlorine.

References Cited by the Examiner
UNITED STATES PATENTS

| | | |
|---|---|---|
| 2,777,864 | 1/1957 | Bernstein et al. ____ 260—397.45 |
| 2,838,497 | 6/1958 | Spero et al. _____ 260—239.55 |
| 2,838,498 | 6/1958 | Magerlein et al. __ 260—239.55 |
| 2,838,546 | 6/1958 | Magerlein et al. ___ 260—397.45 |
| 2,838,548 | 6/1958 | Magerlein et al. __ 260—397.45 |

LEWIS GOTTS, *Primary Examiner.*

JULIUS FROME, B. E. LANHAM, MORRIS LIEBMAN, *Examiners.*